US009269060B2

(12) United States Patent
Maes

(10) Patent No.: US 9,269,060 B2
(45) Date of Patent: Feb. 23, 2016

(54) METHODS AND SYSTEMS FOR GENERATING METADATA DESCRIBING DEPENDENCIES FOR COMPOSABLE ELEMENTS

(75) Inventor: Stephane H. Maes, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 12/948,247

(22) Filed: Nov. 17, 2010

(65) Prior Publication Data
US 2011/0145278 A1 Jun. 16, 2011

Related U.S. Application Data

(60) Provisional application No. 61/262,964, filed on Nov. 20, 2009.

(51) Int. Cl.
G06F 7/00 (2006.01)
G06Q 10/06 (2012.01)

(52) U.S. Cl.
CPC ..................................... G06Q 10/06 (2013.01)

(58) Field of Classification Search
CPC combination set(s) only.
See application file for complete search history.

(56) References Cited

U.S. PATENT DOCUMENTS

| | | | |
|---|---|---|---|
| 5,414,812 | A | 5/1995 | Filip et al. |
| 5,613,060 | A | 3/1997 | Britton et al. |
| 5,699,513 | A | 12/1997 | Feigen et al. |
| 5,737,321 | A | 4/1998 | Takahashi |
| 5,786,770 | A | 7/1998 | Thompson |
| 5,850,517 | A | 12/1998 | Verkler et al. |
| 5,867,665 | A | 2/1999 | Butman et al. |
| 5,946,634 | A | 8/1999 | Korpela |
| 6,115,690 | A | 9/2000 | Wong |

(Continued)

FOREIGN PATENT DOCUMENTS

| | | |
|---|---|---|
| EP | 2 034 748 A1 | 3/2009 |
| WO | 2008111027 | 12/2008 |
| WO | 2008146097 | 12/2008 |

OTHER PUBLICATIONS

U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.

(Continued)

*Primary Examiner* — Apu Mofiz
*Assistant Examiner* — Thu Nga Nguyen
(74) *Attorney, Agent, or Firm* — Kilpatrick Townsend & Stockton LLP

(57) ABSTRACT

Embodiments of the invention provide systems and methods for generating metadata describing dependencies for composable elements. The method includes maintaining a database of composable elements. Each composable element may have associated metadata to describe dependencies for the composable elements. The method may further include receiving a request to compose two or more of the composable elements into a new element. The method may then compare the dependencies of the two or more composable elements in order to determine dependencies common to the two or more composable elements and unique to the two or more composable elements. Further, the method may determine a level of restriction for each of the common dependencies and generate metadata for the new element to include each of the unique dependencies and each of the common dependencies, wherein the common dependencies are set to the highest level of restriction.

20 Claims, 10 Drawing Sheets

(56) References Cited

U.S. PATENT DOCUMENTS

| | | |
|---|---|---|
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1* | 11/2004 | Byrne et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,333 B1 | 2/2007 | Shafron |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,266,600 B2 | 9/2007 | Fletcher et al. |
| 7,269,162 B1 | 9/2007 | Turner |
| 7,269,431 B1 | 9/2007 | Gilbert |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,644,145 B2 | 1/2010 | Rockwell |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,730,129 B2 | 6/2010 | Wang et al. |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,027,921 B1 | 9/2011 | Boydstun et al. |
| 8,036,362 B1 | 10/2011 | Skinner |
| 8,060,067 B2 | 11/2011 | Tarleton et al. |
| 8,068,860 B1 | 11/2011 | Midkiff |
| 8,086,665 B2 | 12/2011 | Soukup et al. |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,335,862 B2 | 12/2012 | Fletcher et al. |
| 8,370,506 B2 | 2/2013 | Maes |
| 8,401,022 B2 | 3/2013 | Maes et al. |
| 8,458,703 B2 | 6/2013 | Maes |
| 8,478,311 B2 | 7/2013 | Sennett et al. |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 8,879,547 B2 | 11/2014 | Maes |
| 8,914,493 B2 | 12/2014 | Maes et al. |
| 8,966,498 B2 | 2/2015 | Maes |
| 9,038,082 B2 | 5/2015 | Maes |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0075844 A1 | 6/2002 | Hagen |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120729 A1 | 8/2002 | Faccin et al. |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |

(56) References Cited

U.S. PATENT DOCUMENTS

| | | |
|---|---|---|
| 2003/0140115 A1 | 7/2003 | Mehra |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1 | 1/2004 | Fellenstein et al. |
| 2004/0024720 A1 | 2/2004 | Fairweather |
| 2004/0044647 A1 | 3/2004 | Salmenkaita |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1* | 5/2004 | Jhanwar et al. ............... 717/169 |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1 | 7/2008 | Hursey et al. |
| 2008/0172482 A1 | 7/2008 | Shah |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1* | 8/2008 | Wookey ....................... 717/175 |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1* | 11/2008 | Sajja et al. ........................ 705/1 |

(56) References Cited

U.S. PATENT DOCUMENTS

| | | | |
|---|---|---|---|
| 2008/0288966 A1 | 11/2008 | Maes | |
| 2008/0292074 A1 | 11/2008 | Boni et al. | |
| 2008/0293389 A1 | 11/2008 | Chin et al. | |
| 2008/0301135 A1 | 12/2008 | Alves et al. | |
| 2008/0307108 A1 | 12/2008 | Yan et al. | |
| 2008/0313648 A1 | 12/2008 | Wang et al. | |
| 2009/0003362 A1 | 1/2009 | Pattabhiraman et al. | |
| 2009/0006360 A1 | 1/2009 | Liao et al. | |
| 2009/0015433 A1 | 1/2009 | James et al. | |
| 2009/0022072 A1 | 1/2009 | Zhu et al. | |
| 2009/0022286 A1 | 1/2009 | Brunson et al. | |
| 2009/0034426 A1 | 2/2009 | Luft et al. | |
| 2009/0086950 A1 | 4/2009 | Vendrow et al. | |
| 2009/0093240 A1 | 4/2009 | Lang | |
| 2009/0106677 A1 | 4/2009 | Son et al. | |
| 2009/0109959 A1 | 4/2009 | Elliott et al. | |
| 2009/0112875 A1 | 4/2009 | Maes | |
| 2009/0119303 A1 | 5/2009 | Rio et al. | |
| 2009/0119672 A1 | 5/2009 | Bussard et al. | |
| 2009/0125595 A1 | 5/2009 | Maes | |
| 2009/0132220 A1 | 5/2009 | Chakraborty et al. | |
| 2009/0132717 A1 | 5/2009 | Maes | |
| 2009/0154681 A1 | 6/2009 | Kung et al. | |
| 2009/0180440 A1 | 7/2009 | Sengupta et al. | |
| 2009/0185576 A1 | 7/2009 | Kisel et al. | |
| 2009/0187919 A1 | 7/2009 | Maes | |
| 2009/0192992 A1 | 7/2009 | Arthursson | |
| 2009/0193057 A1 | 7/2009 | Maes | |
| 2009/0193433 A1 | 7/2009 | Maes | |
| 2009/0201917 A1 | 8/2009 | Maes et al. | |
| 2009/0222541 A1 | 9/2009 | Monga et al. | |
| 2009/0222836 A1 | 9/2009 | Paval | |
| 2009/0222858 A1 | 9/2009 | Hjelm et al. | |
| 2009/0228584 A1 | 9/2009 | Maes et al. | |
| 2009/0253434 A1 | 10/2009 | Hayashi et al. | |
| 2009/0306834 A1 | 12/2009 | Hjelm et al. | |
| 2009/0328051 A1 | 12/2009 | Maes | |
| 2010/0037157 A1 | 2/2010 | Chang et al. | |
| 2010/0049640 A1 | 2/2010 | Maes | |
| 2010/0049826 A1 | 2/2010 | Maes | |
| 2010/0058436 A1 | 3/2010 | Maes | |
| 2010/0070447 A1* | 3/2010 | Pfuntner et al. | 706/47 |
| 2010/0077082 A1 | 3/2010 | Hession et al. | |
| 2010/0083285 A1* | 4/2010 | Bahat et al. | 719/328 |
| 2010/0091764 A1 | 4/2010 | Gonzalez et al. | |
| 2010/0128696 A1 | 5/2010 | Fantini et al. | |
| 2010/0153865 A1 | 6/2010 | Barnes et al. | |
| 2010/0185772 A1 | 7/2010 | Wang et al. | |
| 2010/0192004 A1 | 7/2010 | Bauchot et al. | |
| 2010/0235844 A1 | 9/2010 | Arwe et al. | |
| 2010/0281488 A1* | 11/2010 | Krishnamurthy et al. | 718/106 |
| 2011/0035443 A1 | 2/2011 | Jensen | |
| 2011/0125909 A1 | 5/2011 | Maes | |
| 2011/0125913 A1 | 5/2011 | Maes | |
| 2011/0126261 A1 | 5/2011 | Maes | |
| 2011/0134804 A1 | 6/2011 | Maes | |
| 2011/0134843 A1 | 6/2011 | Noldus et al. | |
| 2011/0142211 A1 | 6/2011 | Maes | |
| 2011/0145347 A1 | 6/2011 | Maes | |
| 2011/0182205 A1 | 7/2011 | Gerdes et al. | |
| 2011/0258619 A1* | 10/2011 | Wookey | 717/175 |
| 2011/0280383 A1 | 11/2011 | Varga et al. | |
| 2012/0045040 A1 | 2/2012 | Maes | |
| 2012/0047506 A1 | 2/2012 | Maes | |
| 2012/0106728 A1 | 5/2012 | Ghaffari et al. | |
| 2012/0173745 A1 | 7/2012 | Maes | |

OTHER PUBLICATIONS

U.S. Appl. No. 11/024,160, filed Dec. 27, 2004, Office Action dated Feb. 7, 2011, 11 pages.

U.S. Appl. No. 11/939,705, filed Nov. 14, 2007, Final Office Action mailed Mar. 17, 2011, 21 pages.

Author Unknown, "Assuring Quality of Experience for IPTV—White Paper," Heavy Reading, Jul. 2006, 18 pages.

U.S. Appl. No. 11/848,347, filed Aug. 31, 2007, Notice of Allowance mailed Mar. 2, 2012, 9 pages.

U.S. Appl. No. 11/951,500, filed Dec. 6, 2007, Office Action mailed Apr. 11, 2012, 6 pages.

U.S. Appl. No. 11/070,317, filed Mar. 1, 2005, Office Action dated Mar. 15, 2012, 10 pages.

U.S. Appl. No. 11/939,705, filed Nov. 14, 2007, Final Office Action mailed Mar. 15, 2012, 16 pages.

U.S. Appl. No. 12/045,220, filed Mar. 10, 2008, Final Office Action dated Mar. 15, 2012, 20 pages.

U.S. Appl. No. 12/019,335, filed Jan. 24, 2008, Advisory Action mailed Feb. 27, 2012, 3 pages.

U.S. Appl. No. 12/544,484, filed Aug. 20, 2009, Advisory Action dated Feb. 9, 2012, 2 pages.

U.S. Appl. No. 11/949,930, filed Dec. 4, 2007, Notice of Allowance mailed Mar. 19, 2012, 19 pages.

U.S. Appl. No. 12/014,387, filed Jan. 15, 2008, Final Office Action mailed Apr. 5, 2012, 17 pages.

U.S. Appl. No. 12/018,718, filed Jan. 23, 2008, Final Office Action mailed Feb. 1, 2012, 30 pages.

U.S. Appl. No. 12/019,299, filed Jan. 24, 2008, Advisory Action mailed Nov. 3, 2011, 2 pages.

U.S. Appl. No. 12/019,299, filed Jan. 24, 2008, Office Action mailed Feb. 16, 2012, 18 pages.

International Search Report and Written Opinion of PCT/US2010/037074 mailed Jun. 1, 2011, 16 pages.

U.S. Appl. No. 11/848,347, filed Aug. 31, 2007, Advisory Action mailed May 23, 2011, 3 pages.

U.S. Appl. No. 11/926,738, filed Oct. 29, 2007, Advisory Action mailed May 25, 2011, 3 pages.

U.S. Appl. No. 11/943,101, filed Nov. 20, 2007, Advisory Action mailed Apr. 28, 2011, 3 pages.

U.S. Appl. No. 11/951,500, filed Dec. 6, 2007, Final Office Action mailed Apr. 14, 2011, 33 pages.

U.S. Appl. No. 11/024,160, filed Dec. 27, 2004, Final Office Action dated Jun. 1, 2011, 11 pages.

U.S. Appl. No. 12/019,335, filed Jan. 24, 2008, Office Action mailed May 23, 2011, 18 pages.

U.S. Appl. No. 12/544,484, filed Aug. 20, 2009, Office Action dated Jun. 3, 2011, 6 pages.

U.S. Appl. No. 11/969,343, filed Jan. 4, 2008, Office Action mailed Jun. 10, 2011, 13 pages.

U.S. Appl. No. 11/926,738, filed Oct. 29, 2007, Notice of Allowance mailed Aug. 5, 2011, 13 pages.

U.S. Appl. No. 11/943,101, filed Nov. 20, 2007, Office Action mailed Jul. 28, 2011, 11 pages.

U.S. Appl. No. 11/951,500, filed Dec. 6, 2007, Advisory Action mailed Jul. 15, 2011, 3 pages.

U.S. Appl. No. 11/024,160, filed Dec. 27, 2004, Notice of Allowance dated Aug. 4, 2011, 15 pages.

U.S. Appl. No. 11/939,705, filed Nov. 14, 2007, Office Action mailed Sep. 28, 2011, 15 pages.

U.S. Appl. No. 12/045,220, filed Mar. 10, 2008, Office Action dated Sep. 27, 2011, 20 pages.

U.S. Appl. No. 12/364,642, filed Feb. 3, 2009, Final Office Action dated Jul. 1, 2011, 20 pages.

U.S. Appl. No. 12/364,642, filed Feb. 3, 2009, Advisory Action dated Sep. 16, 2011, 3 pages.

U.S. Appl. No. 11/357,653, filed Feb. 16, 2006, Final Office Action dated Aug. 2, 2011, 19 pages.

U.S. Appl. No. 12/544,459, filed Aug. 20, 2009, Notice of Allowance mailed Aug. 22, 2011, 8 pages.

U.S. Appl. No. 11/949,930, filed Dec. 4, 2007, Office Action mailed Sep. 29, 2011, 19 pages.

U.S. Appl. No. 12/014,387, filed Jan. 15 2008, Office Action mailed Sep. 7, 2011, 18 pages.

U.S. Appl. No. 12/018,718, filed Jan. 23, 2008, Office Action mailed Jun. 22, 2011, 23 pages.

U.S. Appl. No. 12/019,299, filed Jan. 24, 2008, Final Office Action mailed Aug. 25, 2011, 20 pages.

U.S. Appl. No. 11/024,160, filed Dec. 27, 2004, Maes.

(56) References Cited

OTHER PUBLICATIONS

Andrews, Tony et al, Business Process Execution Language for Web Services, Version 1.1, BEA Systems, International Business Machines Corporation, SAP AG, Siebel Systems, May 5, 2003, 31 pages.

Burger, E. et al., "Deploying CCXML for Application-Layer Call Control," Aug. 2006, 11 pages.

Kim et al., "Implementation of Third Party Based Call Control using Parlay Network API in SIP Environment," ICOIN 2003, LNCS 2662, 2003, pp. 416-425.

Liberty Architecture Overview, Liberty Alliance Project Version 1.1, Piscataway New Jersey, Jan. 15, 2003, 44 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Maes, Stephanie, Multi-modal Web IBM Position W3C/WAP Workshop, IBM Research Human Language Technologies, downloaded http://www.w3.org on May 26, 2003, 9 pages.

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

O'Doherty, Phelim, "JSLEE—SIP Servlet", <http://java.sun.com/products/jain/JSLEE-SIPServlet.pdf, 2003, 13 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Romellini, C. et al., "CCXML: The Power of Standardization," Loquendo, Sep. 27, 2005, 7 pages.

Seely, Scott, "XML and Web Services Security: Understanding WS-Security", Microsoft Corporation, 2002, 11 pages.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May 26, 2003, 5 pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

The Parlay Group, "Specifications", <http://web.archive.org/web/20050114014707/www.parlay.org/specs/index.asp>, Jan. 14, 2005, 2 pages.

Thomas Manes, Anne, "Registering a Web Service in UDDI", 2003, 9 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/848,347, filed Aug. 31, 2007, Office Action mailed Sep. 30, 2010, 19 pages.

U.S. Appl. No. 11/877,129, filed Oct. 23, 2007, Advisory Action mailed Jun. 3, 2010, 2 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Notice of Allowance mailed Aug. 5, 2010, 6 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 2010, 12 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Office Action mailed Nov. 10, 2010, 12 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 11/943,101, filed Nov. 20, 2007, Office Action mailed Aug. 27, 2010, 11 pages.

U.S. Appl. No. 11/951,500, filed Dec. 6, 2007, Advisory Action mailed Jun. 24, 2010, 2 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 1, 2010, 30 pages.

U.S. Appl. No. 11/951,500, filed Dec. 6, 2007, Office Action mailed Sep. 22, 2009, 24 pages.

U.S. Appl. No. 12/019,299, filed Jan. 24, 2008, Advisory Action dated Dec. 9, 2010, 3 pages.

U.S. Appl. No. 12/019,299, filed Jan. 24, 2008, Final Office Action mailed Oct. 6, 2010, 20 pages.

U.S. Appl. No. 12/019,299, filed Jan. 24, 2008, Office Action mailed Mar. 31, 2010, 13 pages.

U.S. Appl. No. 12/019,299, filed Jan. 24, 2008, Office Action mailed Jan. 24, 2011, 16 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 10/855,999, filed May 28, 2004, Office Action dated Jun. 24, 2010, 20 pages.

U.S. Appl. No. 10/855,999, filed May 28, 2004, Final Office Action dated Jan. 5, 2011, 19 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. 11/024,160, filed Dec. 27, 2004, Final Office Action dated Feb. 11, 2009, 9 pages.

U.S. Appl. No. 11/024,160, filed Dec. 27, 2004, Office Action dated Jun. 29, 2009, 9 pages.

U.S. Appl. No. 11/024,160, filed Dec. 27, 2004, Office Action dated Jun. 9, 2010, 10 pages.

U.S. Appl. No. 11/024,160, filed Dec. 27, 2004, Office Action dated Aug. 22, 2008, 8 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

(56) References Cited

OTHER PUBLICATIONS

U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 12/364,642, filed Feb. 3, 2009, Office Action dated Dec. 20, 2010, 18 pages.
U.S. Appl. No. 11/357,653, filed Feb. 16, 200, Office Action dated Jan. 20, 2011, 18 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 11/357,653, Final Office Action mailed on Aug. 18, 2014, 15 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 2014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/957,697, Advisory Action mailed on May 29, 2014, 2 pages.
U.S. Appl. No. 12/957,470, Advisory Action mailed on May 23, 2014, 3 pages.
U.S. Appl. No. 13/029,226, Non-Final Office Action mailed on May 22, 2014, 12 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Advisory Action dated Mar. 18, 2011, 5 pages.
U.S. Appl. No. 10/855,999, filed May 28, 2004, Non-Final Office Action dated Mar. 28, 2013, 42 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.

(56) References Cited

OTHER PUBLICATIONS

U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/791,129, filed Jun. 1, 2010, Final Office Action mailed Dec. 20, 2013, 10 pages.
U.S. Appl. No. 12/949,183, filed Nov. 18, 2010, Final Office Action mailed Jan. 21, 2014, 19 pages.
U.S. Appl. No. 13/029,219, filed Feb. 17, 2011, Advisory Action mailed Jan. 2, 2014, 3 pages.
U.S. Appl. No. 13/029,226, filed Feb. 17, 2011, Final Office Action mailed Jan. 30, 2014, 17 pages.
U.S. Appl. No. 11/357,653, Non Final Office Action mailed on Mar. 27, 2014, 19 pages.
U.S. Appl. No. 11,969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Non Final Office Action mailed on Jul. 26, 2013, 19 pages.
U.S. Appl. No. 12/045,220, Final Office Action mailed on Apr. 18, 2014, 20 pages.
U.S. Appl. No. 12/544,484, Non Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.
U.S. Appl. No. 12/949,183, Advisory Action mailed on Apr. 10, 2014, 3 pages.
U.S. Appl. No. 12/957,697, Final Office Action mailed on Mar. 20, 2014, 12 pages.
U.S. Appl. No. 12/957,740, Final Office Action mailed on Feb. 19, 2014, 18 pages.
U.S. Appl. No. 13/029,219, Non Final Office Action mailed on Apr. 11, 2014, 23 pages.
U.S. Appl. No. 13/029,226, Advisory Action mailed on Apr. 7, 2014, 3 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
U.S. Appl. No. 10/855,999, Non-Final Office Action mailed on Jun. 17, 2015, 16 pages.
U.S. Appl. No. 12/018,718, Final Office Action mailed on Jun. 30, 2015, 22 pages.
U.S. Appl. No. 12/957,697, Final Office Action mailed on Jun. 18, 2015, 12 pages.
U.S. Appl. No. 13/029,226, Non-Final Office Action mailed on Jun. 19, 2015, 13 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010 Non-Final Office Action mailed Oct. 1, 2013, 10 pages.
U.S. Appl. No. 10/855,999, filed May 28, 2004, Final Office Action dated Nov. 18, 2013, 14 pages.
U.S. Appl. No. 12/957,697, Non-Final Office Action mailed on Jul. 2, 2014, 9 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/123,468, Non-Final Office Action mailed on Jan. 30, 2015, 19 pages.
U.S. Appl. No. 12/544,484, Final Office Action mailed on Dec. 26, 2014, 12 pages.
U.S. Appl. No. 12/949,183, Final Office Action mailed on Jan. 22, 2015, 16 pages.
U.S. Appl. No. 12/949,287, Final Office Action mailed on Dec. 23, 2014, 27 pages.
U.S. Appl. No. 12/957,697, Advisory Action mailed on Feb. 3, 2015, 3 pages.
U.S. Appl. No. 12/957,697, Final Office Action mailed on Nov. 26, 2014, 11 pages.
U.S. Appl. No. 13/029,219, Notice of Allowance mailed on Jan. 22, 2015, 12 pages.
U.S. Appl. No. 13/029,226, Final Office Action mailed on Jan. 8, 2015, 13 pages.
U.S. Appl. No. 12/544,484, Advisory Action mailed on Mar. 10, 2015, 3 pages.
U.S. Appl. No. 12/949,183, Advisory Action mailed on Mar. 26, 2015, 3 pages.
U.S. Appl. No. 12/949,287, Advisory Action mailed on Mar. 10, 2015, 3 pages.
U.S. Appl. No. 12/957,697, Non-Final Office Action mailed on Mar. 6, 2015, 11 pages.
U.S. Appl. No. 12/957,740, Non-Final Office Action mailed on Feb. 13, 2015, 17 pages.
U.S. Appl. No. 13/029,226, Advisory Action mailed on Mar. 25, 2015, 2 pages.

\* cited by examiner

Example: A customer record from, CRM is translated into a generic Enterprise Business Object (EBO) And then pushed out to billing and revenue management system in the format required.

METHODS AND SYSTEMS FOR GENERATING METADATA DESCRIBING DEPENDENCIES FOR COMPOSABLE ELEMENTS

This application claims priority to U.S. Provisional Application No. 61/262,964 filed Nov. 20, 2009 entitled "Methods and Systems for Generating Metadata Describing Dependencies for Composable Elements", which is incorporated by reference herein in its entirety.

BACKGROUND OF THE INVENTION

Embodiments of the present invention relate generally to methods and systems of generating metadata for elements/services, and more particularly to generating, coordinating, composing, and defining the algebra of metadata for describing dependencies for composable elements/services, including as such composable elements/services to be updated, reprogrammed, composed, repurposed, etc.

As automation of OSS/BSS/SDP integration is currently being driven, it becomes difficult for such integration to be dynamic and be applied to the latest type of services. Many services are currently reprogrammable and/or composable. Such services are essentially provided in the form of generic software which is often compliant with, for example, a service-oriented architecture (SOA) (e.g., Web services, SCA, and/or Java compositions). It should be noted that such methodologies work regardless of the technologies used or the composition mechanism. When applications are combined or reprogrammed, they become new applications. If a service provider wants to sell usage licenses or subscriptions to the newly combined or reprogrammed application, the service provider should be able to represent to customers packages of such applications and available prices, plans, and services related to them offered in bundles or (with a discount) as part of promotions or as part of other sales strategies, in a timely manner. As new applications can be created quite rapidly, modeling available services and products should be equally as rapid. This is presently not the case and much manual creation of services and product catalogs is necessary.

In one example, FIG. 1(a) illustrates a lifecycle 100 for various services, in this case for telecommunications processes. Since it would be desirable to minimize the time, risk, and effort in proceeding from service conception to revenue-generating deployment, it would be desirable to automate such a process. It is further desirable to provide a near zero-touch service lifecycle with an end-to-end solution that can easily be provided to industries such as the telecommunications industry. As seen, the lifecycle runs from conception 102 through creation and assembly 104 to implementation 106, which then may require further conception, creation, and assembly. The service is then provisioned and deployed 108, finally arriving at the revenue generation and management stage 110.

Additional information regarding OSS/BSS/SDP integration can be found in U.S. patent application Ser. No. 12/019,335, filed on Jan. 24, 2008, entitled INTEGRATING OPERATIONAL AND BUSINESS SUPPORT SYSTEMS WITH A SERVICE DELIVERY PLATFORM, which is incorporated by reference herein in its entirety for any and all purposes.

FIG. 1(b) further illustrates a lifecycle example by detailing the concept-to-cash value chain 150. The chain passes from creation to design and configuration for the service. After execution of an appropriate campaign, the service fulfillment stage occurs, where inventory is assigned, and the service is provisioned and activated. The service usage and charging phase is then carried out such that the service can arrive at the billing and collections state or revenue management.

Hence, automation of such a cycle is of interest. However, for example, between phases 1 and 3 (FIG. 1(b)) of such a cycle, pieces of software (and possibly hardware) are reprogrammed, repurposed, combined, composed, updated, etc., and when this happens, there is a need on the part the service creation environment (SCE) to know what can be composed and on the part of the BSS or OSS service that performs the management to know that it may combine two software programs because they are compatible, have similar dependencies satisfy mutual dependencies, or determine which dependencies deal with incompatible or incomplete combinations in other cases, how to know what are the different systems that must be managed when a combination of components is managed, etc. Accordingly, aspects of the present invention are related to defining and coordinating metadata to address these problems.

BRIEF SUMMARY OF THE INVENTION

Embodiments of the invention provide systems and methods for generating metadata for describing dependencies for composable elements/services. The method may include maintaining a database of composable elements. Each composable element may have associated metadata to describe dependencies (what can be composed and what must be managed when the composed component is managed) for the composable elements. The method may further include receiving a request to compose two or more of the composable elements into a new element. The method may then compare the dependencies of the two or more of the composable elements in order to determine dependencies common and unique to the two or more composable elements and generate dependencies of the composed system that identifies the resulting new dependencies. Further, the method may determine a level of restriction for each of the common dependencies, and generate metadata for the new element to include each of the unique dependencies and each of the common dependencies, wherein the common dependencies are set to the highest level of restriction.

According to a further embodiment, a system for generating metadata for describing dependencies for composable elements/services is described. The system may include a database configured to store composable elements. Each of the composable elements may have associated metadata to describe dependencies for each of the composable elements. The system may further include an OSS/BSS coupled with the database. The OSS/BSS may be configured to receive a request to compose two or more composable elements into a new element, compare dependencies of the two or more composable elements in order to determine dependencies common and unique to the two or more composable elements, and determine a level of restriction (i.e., what are the dependencies that must be satisfied, for example, to help determine what other items to bundle in order to have all dependencies satisfied) for each of the common dependencies. For example, if broadband bandwidth is needed, then the service may need to have broadband included directly within the service, or alternatively the service might be bundled with another service which provides broadband. In a further embodiment, the SCE may track the dependencies in a SOA/SW component metadata repository.

The OSS/BSS may be further configured to generate metadata for the new element to include each of the unique dependencies and each of the common dependencies. In one embodiment, this metadata may be generated using dependency algebra. Furthermore, the dependency algebra may not be generated by the OSS/BSS or OSS/BSS SCE tools, as such software tools may be used to generate the composition, customization, reprogramming, repurposing, etc. and generate the dependencies. However, if the combination/repurposing, etc. is not programmed, but purely BSS/OSS packaging, then the OSS/BSS automatically creates the metadata for the new service (or BSS SCE is used).

Furthermore, the common dependencies may be set to the highest level of restriction. However, other options may exist, such as using enough alternatively low bandwidth channels (not used fully at the same time) bundled together to potentially match a certain higher bandwidth requirement, etc. Accordingly, when bundling the higher bandwidth with a set of the other services that provide lower bandwidth the requirement on the bundle is lower. Therefore, aspects of the present invention include algebra for generating the dependencies/requirements. It may be the higher requirements or other formulae that can be included in the metadata or that may be customized/determined by the different systems (i.e., SW SCE, OSS/BSS SCE, OSS/BSS, etc.) or by the designer, programmer, product manager, etc. using these systems.

In yet another embodiment, a machine-readable medium, for generating metadata for describing dependencies for composable elements/services, is described. The machine-readable medium may include instructions for maintaining a database of composable elements. Each composable element may have associated metadata to describe dependencies for the composable elements. The machine-readable medium may further include instructions for receiving a request to compose two or more composable elements into a new element. The machine-readable medium may then include instructions to compare the dependencies of the two or more composable elements in order to determine dependencies common and unique to the two or more composable elements. Further, the machine-readable medium may include instruction to determine a level of restriction for each of the common dependencies, and to generate metadata for the new element instructing it to include each of the unique dependencies and each of the common dependencies, such that the common dependencies are based on or defined by customizable algebra (i.e., rules for combining).

DETAILED DESCRIPTION OF THE INVENTION

Figure 1A:
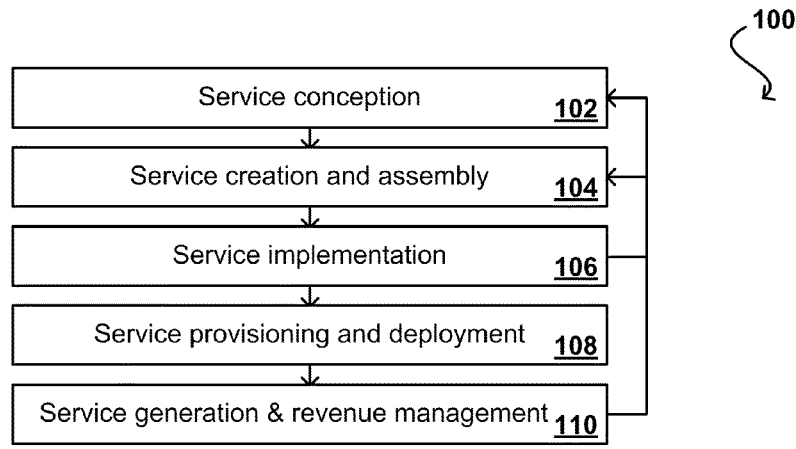
FIGS. 1(a) and 1(b) illustrate examples of a service lifecycle that can be automated in accordance with various embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Embodiments of the invention provide systems and methods for generating metadata for describing dependencies for composable elements/services. In one embodiment, a customer may desire a combination, a reprogramming, a repurposing, etc. of software components and/or services. However, each software component and service typically has associated with it a variety of dependencies stored in metadata. Hence, when composing a new software element or service from multiple software elements or services, these dependencies should be taken into consideration. In many situations, the newly composed service or software application may not function properly or function at all if such dependencies are not taken into account.

Accordingly, when creating a new component or service from other multiple components or services, the dependencies may be combined to include each of the redundant dependencies from the combined components as well as any dependencies unique to each of the combined components or services. Furthermore, if a dependency is common to more than one component or service, then the more restrictive component or service's dependency may be utilized within the new component or service's dependencies. However, alternatively, algebra may be used to determine the new services' dependencies. Thus, proper functionality of the newly created software component or service is ensured because the necessary dependencies have been accounted for.

Figure 2:
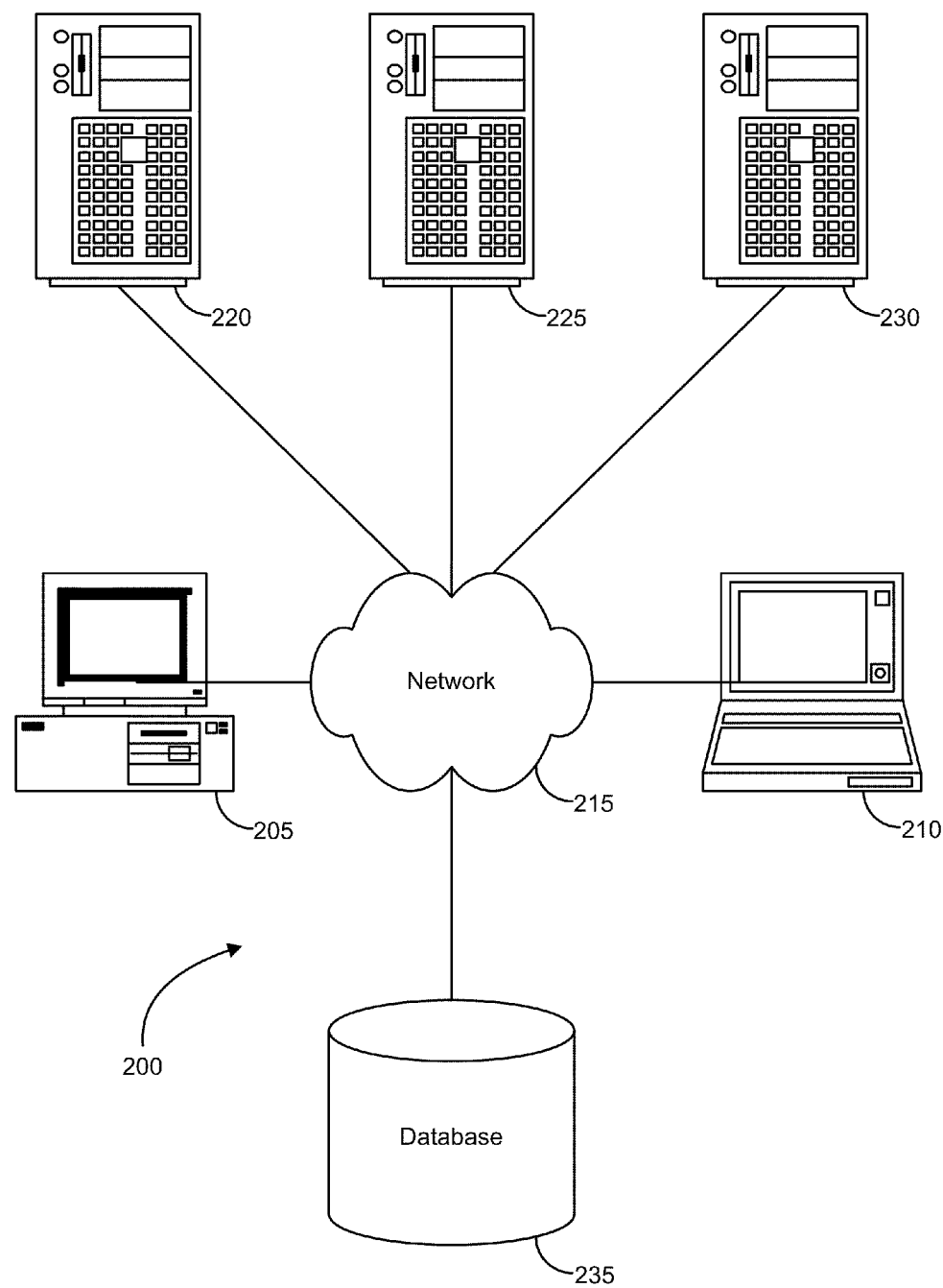
FIG. 2 is a block diagram illustrating components of an exemplary operating environment in which various embodiments of the present invention may be implemented.

Turning now to FIG. 2, a block diagram which illustrates components of an exemplary operating environment in which various embodiments of the present invention may be implemented. The system 200 can include one or more user computers 205, 210, which may be used to operate a client, which may be a dedicated application, web browser, etc. The user computers 205, 210 can be general purpose personal computers (including, merely by way of example, personal computers and/or laptop computers running various versions of Microsoft® Corp.'s Windows® and/or Apple Corp.'s Macintosh® operating systems) and/or workstation computers running any of a variety of commercially available UNIX or UNIX-like operating systems (including, without limitation, the variety of GNU/Linux operating systems). These user computers 205, 210 may also have any of a variety of applications, including one or more development systems, database client and/or server applications, and web browser applications. Alternatively, the user computers 205, 210 may be any other electronic device, such as a thin client computer, Internet-enabled mobile telephone, and/or personal digital assistant, capable of communicating via a network (e.g., the network 215 described below) and/or displaying and navigating web pages or other types of electronic documents. Although the exemplary system 200 is shown with two user computers, any number of user computers may be supported.

In some embodiments, the system 200 may also include a network 215. The network 215 can be any type of network familiar to those skilled in the art that can support data communications using any of a variety of commercially available protocols, including without limitation TCP/IP, SNA, IPX, AppleTalk, and the like. Merely by way of example, the network 215 may be a local area network ("LAN"), such as an Ethernet network, a Token-Ring network and/or the like; a wide-area network; a virtual network, including, without limitation, a virtual private network ("VPN"); the Internet; an intranet; an extranet; a public switched telephone network ("PSTN"); an infrared network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, WiMAX, FemtoCells, HSDPA, WiFI, etc.

The system 200 may also include one or more server computers 220, 225, 230 which can be general purpose computers and/or specialized server computers (including, merely by way of example, PC servers, UNIX servers, mid-range servers, mainframe computers rack-mounted servers, etc.). One or more of the servers (e.g., 230) may be dedicated to running applications, such as a business application, a web server application, an application server, etc. Such servers may be used to process requests from user computers 205, 210. The applications can also include any number of applications for controlling access to resources of the servers 220, 225, 230.

The web server can be running an operating system including any of those discussed above, as well as any commercially available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 205, 210. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 205, 210.

In some embodiments, an application server may create web pages dynamically for displaying on an end-user (client) system. The web pages created by the web application server may be forwarded to a user computer 205 via a web server. Similarly, the web server can receive web page requests and/or input data from a user computer 205, 210 and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 200 may also include one or more databases 235. The database(s) 235 may reside in a variety of locations. By way of example, a database 235 may reside on a storage medium local to (and/or resident in) one or more of the computers 205, 210, 220, 225, 230. Alternatively, it may be remote from any or all of the computers 205, 210, 220, 225, 230, and/or in communication (e.g., via the network 215) with one or more of these. In a particular set of embodiments, the database 235 may reside in a storage-area network ("SAN") familiar to those skilled in the art. Similarly, any necessary files for performing the functions attributed to the computers 205, 210, 220, 225, 230 may be stored locally on the respective computer and/or remotely, as appropriate. In one set of embodiments, the database 235 may be a relational database, such as Oracle® 10g, which is adapted to store, update, and retrieve data in response to SQL-formatted commands.

Figure 3:
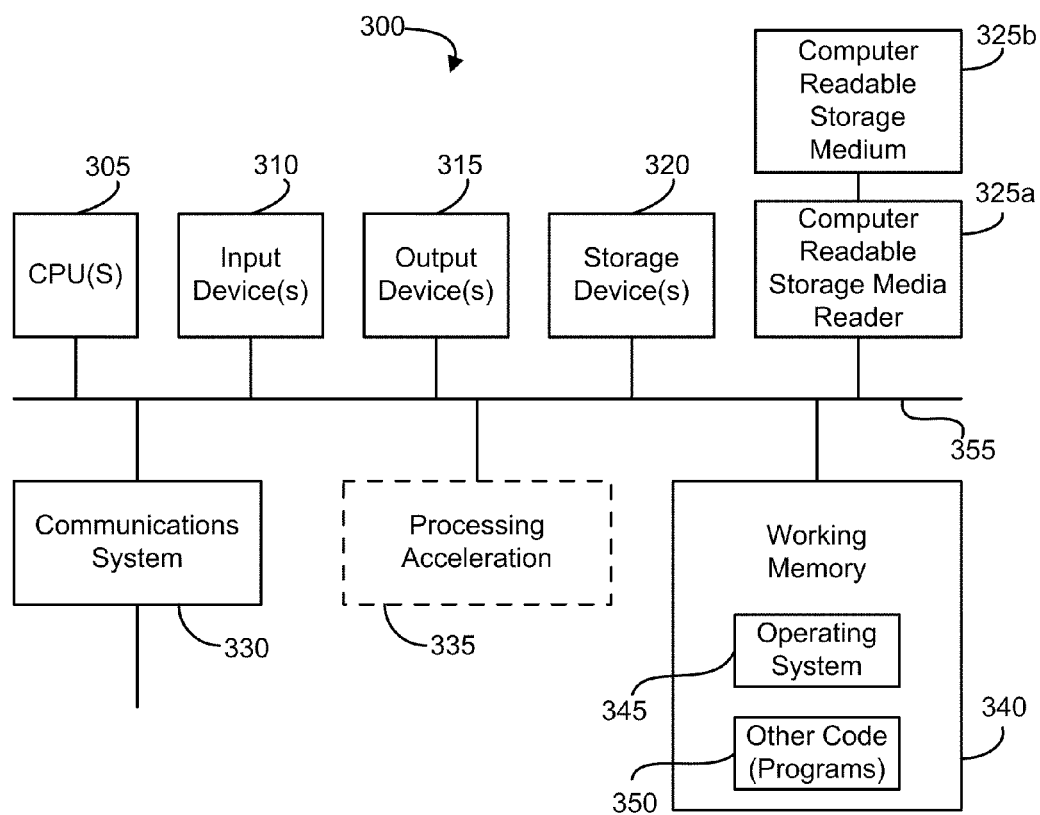
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage devices 320. By way of example, storage device(s) 320 may be disk drives, optical storage devices, solid-state storage devices such as a random access memory ("RAM") and/or a read-only memory ("ROM"), which can be programmable, flash-updateable and/or the like.

The computer system 300 may additionally include a computer-readable storage media reader 325a, a communications system 330 (e.g., a modem, a network card (wireless or wired), an infrared communication device, etc.), and working memory 340, which may include RAM and ROM devices as described above. In some embodiments, the computer system 300 may also include a processing acceleration unit 335, which can include a DSP, a special-purpose processor and/or the like.

Figure 1B:
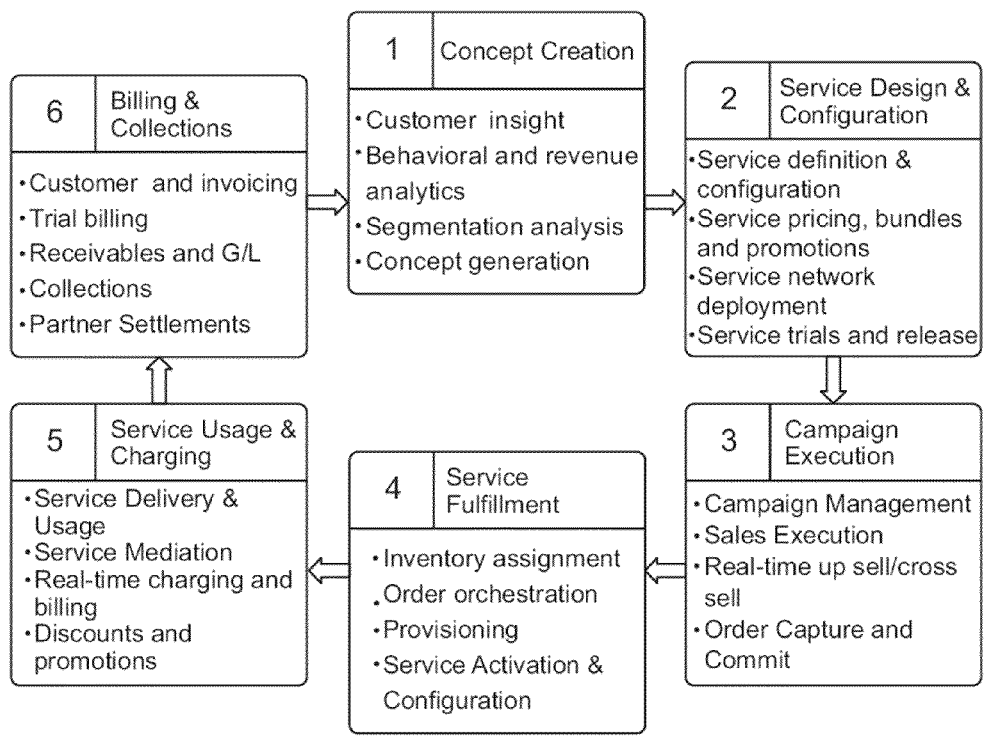

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 115 (FIG. 1) and/or any other computer described above with respect to the system 300.

The computer system 300 may also comprise software elements, shown as being currently located within a working memory 340, including an operating system 345 and/or other code 350, such as an application program (which may be a client application, web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for implementing embodiments of the present invention as described herein.

Figure 4A:
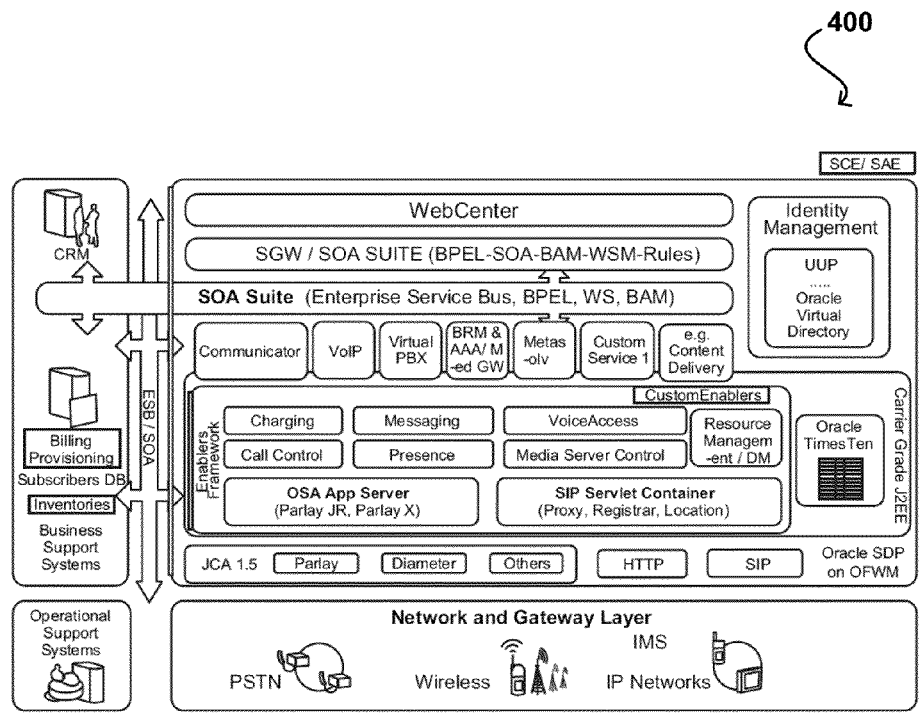
FIGS. 4(a) and 4(b) illustrate a service delivery platform-based architecture that can be used with various embodiments of the present invention.
Figure 4B:
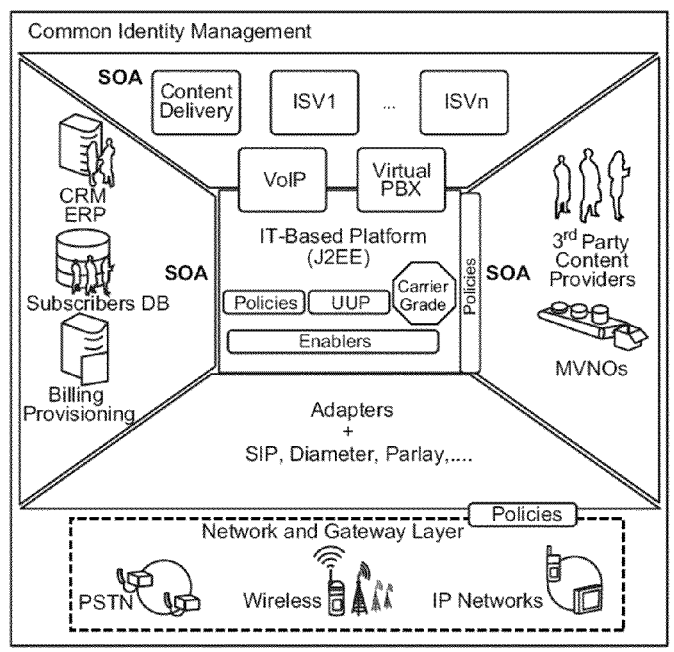

FIGS. 4(a) and 4(b) illustrate an exemplary service delivery platform (SDP)-based architecture 400 that can be used in accordance with one embodiment. In the exemplary architecture 400 of FIG. 4(a), the SDP includes a horizontal, standards-based platform that abstracts the underlying network resources and follows an SOA, found in U.S. patent application Ser. No. 11/357,653, filed on Feb. 16, 2006, entitled FACTORIZATION OF CONCERNS TO BUILD A SDP (SERVICE DELIVERY PLATFORM), which is incorporated by reference herein in its entirety for any and all purposes. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also features mobile, voice, and other communications enablers.

In FIG. 4(b), the SDP configuration 450 implements the desired functionality on top of an underlying J2EE core provided by the application server. It is valuable to have a common identity managed across all the elements and the network, as well as a common view of all the data about a principal application. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA can then be used to provide services such as revenue generating services, utilizing SOA-based policies and business rules (e.g., from third parties). The platform can then provide for SOA-based integration of OSS, BSS, and SDP. Exposure to third party content and service provider can be achieved by SOA to expose, integrate and enforce policies. SOA can be used to also support and rationalize policy management and evaluation throughout the service provider environment.

The SDP can be thought of as a service layer solution that can be deployed on Oracle® fusion middleware/OC4J as well as JBOSS, BEA Weblogic, and IBM Websphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object, etc., can share context and interact with each other, if necessary) and carrier grade (details provided below). This converged state includes the use of TimesTen and open source technologies like JGroups, and can also be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container can also include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. For example, an out-of-the-box IMS presence server and SIP/SIMPLE presence server can also aggregate presence from other networks (e.g. Parlay network presence) and provide northbound parlay X interface for the application to use presence without participating in the presence network. Location data can be modeled as a presence attribute using an extensible presence data model. A multi-channel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that offers online/offline charging balance inquiry and tracking, pre-rated charging, etc., integrated to Ro/Rf (AAA media gateways), Parlay and Oracle® BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity-managed single view of the information about the subscribers (or other principals), from OSS (e.g. assets in inventory), BSS (e.g. bill and subscriptions), network (e.g. HSS via Sh), or Dynamic information (e.g. presence or location), and any other service level-specific information (e.g. credentials, and application or enabler data).

In one embodiment, the service delivery platform (SDP) is a standards-based horizontal platform that abstracts the underlying network resources, and follows a service-oriented architecture. The platform can be an SOA platform based on J2EE, which includes a J2EE converged container and provides various communication enablers. Enablers can include, for example, call control enablers and media server control enablers as discussed elsewhere herein. Further, interfaces can be exposed to applications and other enablers and resources for usage of various forms of functionality. Some or all of the interfaces can be standard or standardizable behavior, such as may include OMA, Parlay, Parlay X, and WS components. For the purpose of the SDP, these enablers can provide various MVC (Mobile/Voice/Communications) functionality. The applications can be built using one or more enablers and can add notions like a user interface (UI), user management, and charging, either in the code or via delegation and orchestration.

Figure 5A:
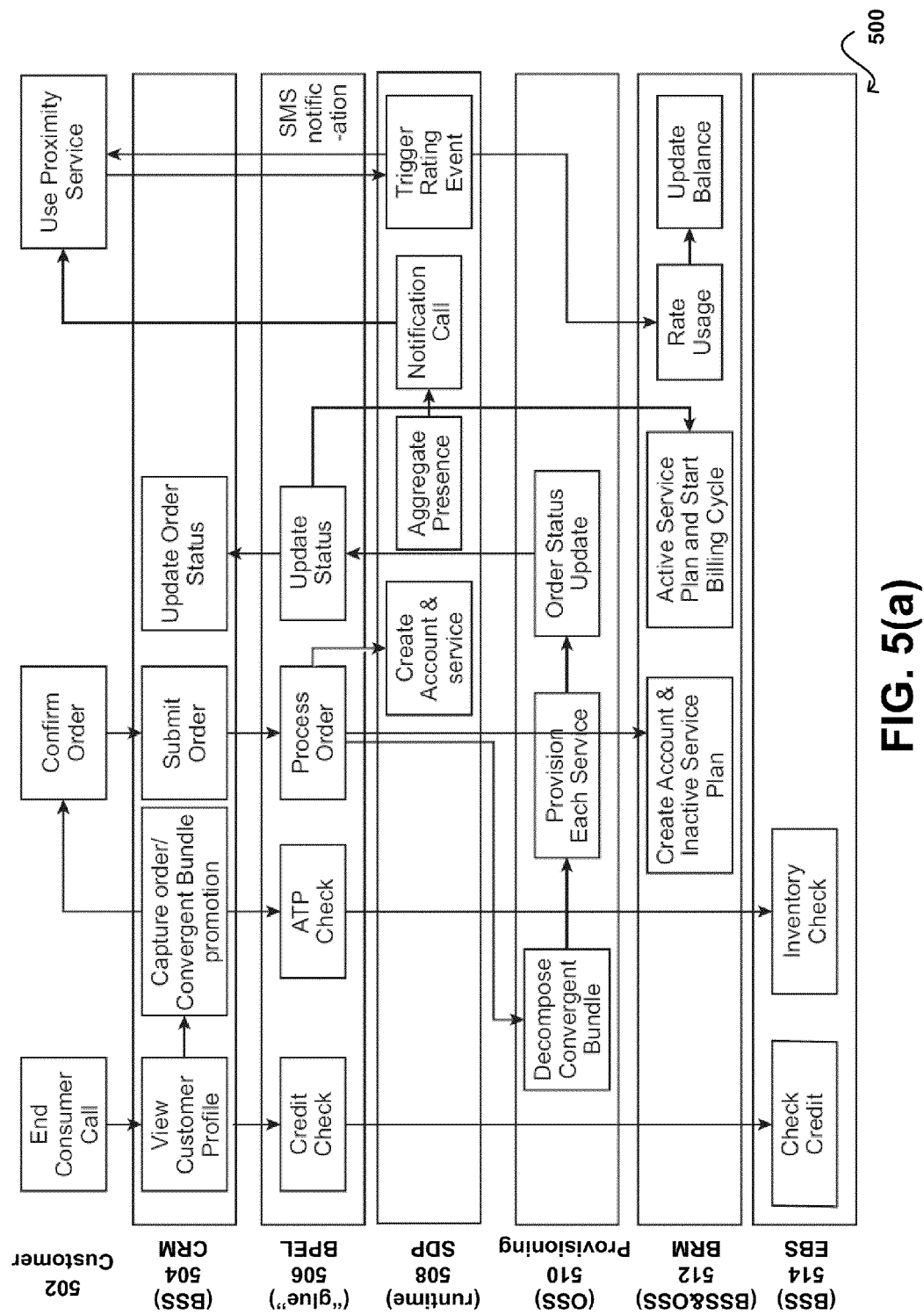
FIGS. 5(a) and 5(b) illustrate exemplary flows that can be utilized in accordance with one embodiment of the present invention.

FIG. 5(a) illustrates an exemplary flow 500 through the components in an integrated architecture such as that described with respect to FIGS. 4(a) and 4(b), A functional description which, for illustration purposes can be found in U.S. patent application Ser. No. 12/019,335, filed on Jan. 24, 2008, entitled INTEGRATING OPERATIONAL AND BUSINESS SUPPORT SYSTEMS WITH A SERVICE DELIVERY PLATFORM, which is incorporated by reference herein in its entirety for any and all purposes. This example illustrates integration with BPEL (business process execution language) instead of a full SOA and event-driven architecture (EDA) where transformations and exchanges occur on an Enterprise Service Bus (ESB) with respect to a canonical data model that also handles error messages, exceptions, etc. This is a conventional SOA/EDA approach, as described hereinafter. A complete detailed architecture for one example rather FIG. 7. In this example, a customer is interacting with an operator system through self-service (e.g., a Web site or IVR) or via a CSR (e.g. a call center or processing of point of sales/forms). The various components and operations are shown at different levels in this example flow, including a customer level 502, a BSS level (here a CRM system component self-service or call center/CSR console) 504, a workflow level 506 (such as a BPEL workflow level in one example—which is used to easily illustrate the invention but alternatively could be accomplished through message transformations (e.g., EEB+BPEL), EDA, and SOA as discussed elsewhere herein, such as with respect to FIG. 7, a runtime application or service level (here the SDP) 508, an OSS level (here a provisioning, activation component and inventories/RMO (resource management operations)) 510, a combined (to some extent) OSS and BSS level (here a Billing and Revenue Management (BRM) component) 512, and another BSS level (here an E-Business Suite (EBS) component) 514 responsible for ERP, Financials, etc. The workflow component 506 acts as the "glue" for bringing the various components together and integrating them. In theory, the transformation is implemented based on the canonical data model that also manages the overall process, and stores/understands its status, such that the SOA/EDA can be used to delegate functions from one component to the other, as well as to allow marshalling a complete process flow from one element to the other, and error message handling supported by an architecture such as that illustrated in FIG. 7. Such a process can be accomplished in a number of ways for the customer, such as in a self-service mode, through a Web page, or interacting with a live operator.

Figure 5B:
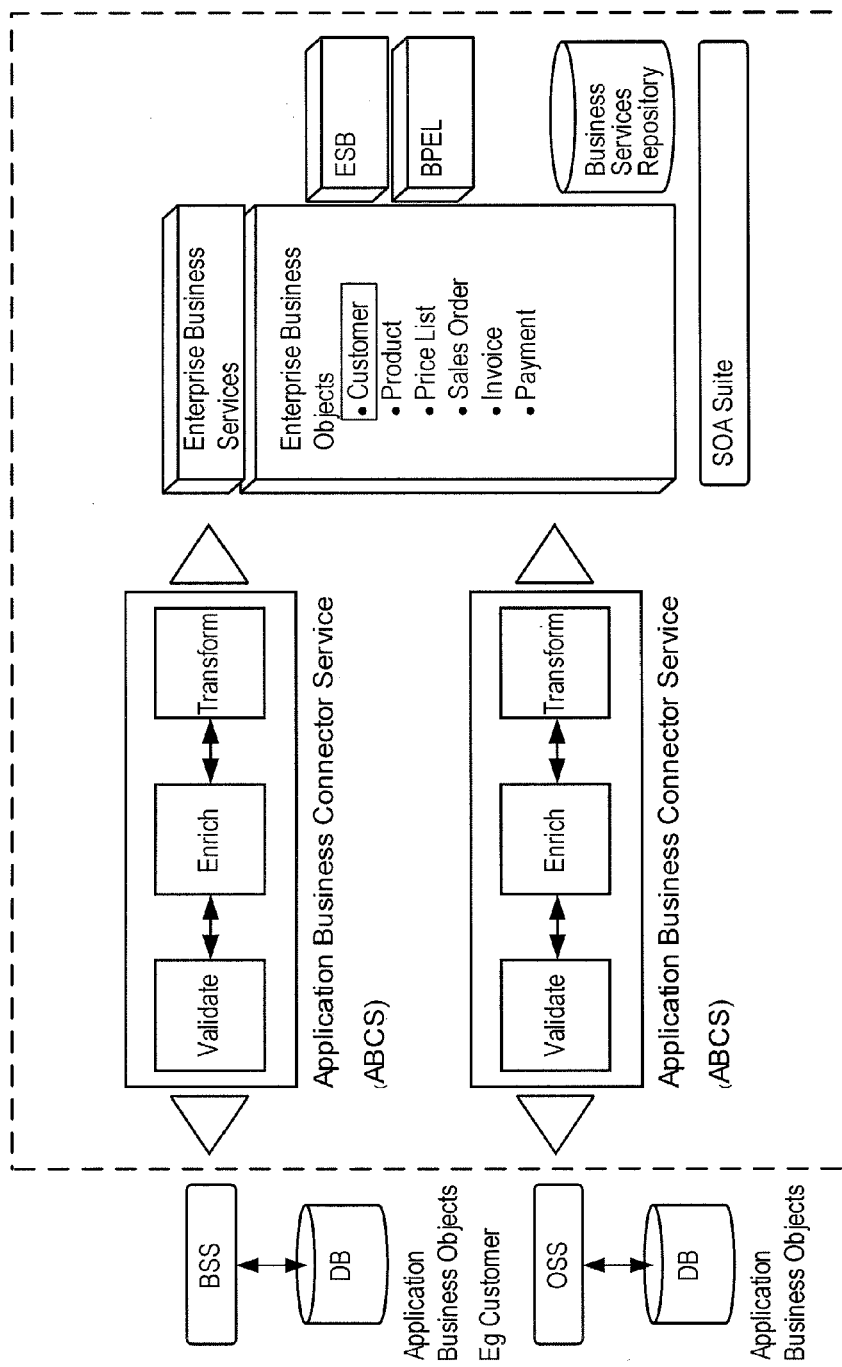

Further details are provided in FIG. 5(b), which illustrates a flow diagram according to aspects of the present invention. FIG. 5(b) describes a number of base principles. For example, application may be modeled as SOA services that are composed and orchestrated on a bus. The applications may exchange messages that are transformed into a common canonical data model. The messages may be used to allow one application to delegate a task to another application, or to allow an overall process to be orchestrated across the applications.

Referring back to FIG. 5(a), when the customer starts interacting with the system in this example, information for the CRM application is collected and retrieved. Some operations can be executed across different BSS components, such as in the case which the customer is going through a process to order a phone and it is necessary to check phone types, availability, quantity to be shipped, etc. Such an operation can be implemented by having a BPEL workflow going from one BSS application to another. Components such as a credit check module and an inventory check module are shown at the bottom as BSS components (here done by querying BSS ERP applications and inventories in RMO). Various types of bundling, campaigns, and promotions can occur during the processing of the order, such as having CRM suggest an item at a reduced price upon purchasing a certain level of service. Once the order is confirmed at the customer level, the order is submitted by the CRM system, a BSS component. As can be seen, submitting the order initiates a BPEL workflow which initiates the composition/decomposition of the order and passes the order processing to the various components that may be required, for example, for order decomposition and fulfillment. In this example, BPEL (i.e., SOA/EDA in the bigger picture) performs parts of the order fulfillment by starting the activation and provisioning of the SDP/applications and passing decomposed order fragments to BRM in order to create accounts and MetaSolv to start further order fulfillment, activation, and provisioning. Accordingly, if an account needs to be created in SDP or an application, for example, the flow can pass a request to the runtime component(s) to create the account and service. The workflow can also pass a request to the OSS to determine the pieces to be provisioned to activate that service for this order. The flow can then pass to a billing system to create the billing information, as well as to store address, user, and other information that will be needed for billing. The rates can be associated with different services for the order so that information can be stored as well.

As can be seen, each of these components can be running independently to perform at least one of these tasks, and can come back to the flow when that task is completed (successfully or unsuccessfully). In one embodiment, this flow is a BPEL workflow, which in other embodiments can involve SOA and EDA, with messages being further transformed to each target component based on canonical data model information. Error and/or result messages are returned accordingly, as well as any other notification/event that the applications may transmit. The overall process may be passed from an application/component to a component, or marshaled from the overall canonical data model to execute an overall SOA/EDA process. This may be triggered externally by other events, command lines, scheduled events, etc. In this example, the last component to return to the workflow is the OSS MetaSolv provisioning, activation, inventory management and order fulfillment application that indicates, after the decomposing part of the order and ensuring activation and provisioning of all items and other fulfillment (e.g., by, for example, ensuring monitoring of shipping the items such as phones or modems to the user), either via direct monitoring of the supply or via interaction with the ERP that directly drives everything to be fulfilled in the order has been activated, provisioned, or otherwise fulfilled. In the example, once the various components are provisioned, it is possible to come back and begin activating each component, as the components are enabled to begin processing for the user. Once the components are activated, the service is ready for use. In the example illustrated here, the service is a proximity service where monitoring of the presence and location information is done, and a proximity is detected. When a customer is close to a particular location, a notification takes place to a proximity service that initiates a call or SMS exchange (or another appropriate messaging channel connection) with the user, and a charge is generated for the activity.

In this example, the user is notified based on preferences that were selected when the user subscribed to the proximity service offered with a wireless plan that was bundled with the phone ordered by the user. Preferences can include, for example, to be notified when a friend or particular store is nearby. So, in one example, when a user is within a specified proximity of a friend, the user can select to receive an automated call informing the user of the proximity and asking whether the user would like to call the friend (such as by selecting "1" to call or "2" to refuse). In another example, when a user walks by a location of a coffee franchise, the user can select to receive any offers or discounts for the franchise. For example, the user can hear the offer, then select "1" to accept the coupon to the device or "2" to refuse. Alternatively, a similar exchange can occur via messaging using a messaging enabler. The user is then charged accordingly, such as for calling to speak to the nearby friend or receiving the coupon. Where the user accepts the coupon, it is possible to charge the user, the franchise, or even the service provider for the call, as well as any discount or free drink given using the coupon. Throughout the system the bill of the subscriber and of the franchise can be seen in real time, such as by using the dashboard of Oracle® BAM (Business Activity Monitoring), which monitors all usage of the system. Bills can be monitored and the data can be captured in Oracle® Financials (books) and analyzed via Business Intelligence like Oracle® BI. That charge will then be reflected in the billing system. In one example, promotions can be suggested to a user, such as when a user is near a coffee shop location that offers a discounted drink, etc. It is then possible to also work with third party partners (such as a coffee retailer who would have the business where the promotion kicks in) in such a way that bills can be determined according to the promotion/pricing as agreed. In this case, the coffee retailer may be charged for the customer to view or select to obtain the promotion, or the service provider might instead decide to pay the retailer for the promotion. The third party can then in real time see the resulting revenue sharing balance and the current usage statistics.

In certain embodiments, the SDP (or the runtime for the network) and the OSS/BSS components utilized are developed for using or are compatible to use the same managed identity so that, independent of the particular network, it can be ensured that the user is the same, and the user identity can be managed appropriately across different networks. Often current systems perform identity management at the network layer or maybe at the service level when the identity is exposed to a third party. Unfortunately, those two identities are rarely linked and managed, and further there is no existing link with the OSS/BSS components as the components exist in a separate layer or environment. Systems and methods in accordance with the various embodiments can combine these components using an SOA, and build the components on the same stack so that they can share managed identities. As a result, it is not possible to truly share services (possibly adapted to the capability of network of the user terminal) on different access networks, much less to share, coordinate, or continue sessions across networks.

By integrating components such as SDP, OSS, and BSS components, an end-to-end integration can be provided that enables consistent OSS/BSS/SDP coexistence across multiple network technologies, enabling evolutionary deployments of NGNs, as well as enabling consistent OSS/BSS/SDP and service sharing across multiple network technologies or providers, enabling true convergence. Such an approach also provides for business-driven management with almost zero interaction between the service provider systems.

A service (i.e., an application or set of applications that can be sold or offered to a customer) can be conceived and defined in terms of its dependencies on a service provider's assets. These dependencies include the type of asset or required feature, a type of settings, a location for the assets to support the service, how the assets should be assigned, required bandwidth, etc. An OSS/BSS service creation tool allows capture of that information as metadata associated to the service. The tool can also associate metadata with all of the assets in the service catalog and inventory of the service provider to help match capabilities of assets with dependencies by describing these capabilities. A BSS service assembly environment is therefore a tool or a process that allows assembly, reprogramming, repurposing, and other such changes/updates of a defined service based on an available assets in a catalog and inventory. Missing assets may initiate OSS/BSS (e.g., ERP) processes to acquire the missing items or build the item (e.g. as a software application via software design or composition) on the SDP. They can also trigger alerts to contact the subscriber and see if the service provider should upgrade, sell other services, refund, etc. When software is configured, reprogrammed, or composed to produce a new application, metadata is associated therewith. When making the metadata available in a software catalog or registry, for example, an SOA flow can be initiated. This flow/process places the appropriate data in catalogs such as a product catalog, service catalog, and inventories of assets to reflect the new items. The catalogs of product, services, and/or inventory are therefore appropriately updated with the available new service. Through OSS/BSS tools (e.g., CRM) it is possible to price, and create campaign promotions, bundle recommendations, etc., which can be sold along with the rest of the offerings. The service can then be deployed and provisioned, activated or run, and charged or billed for usage on the SDP along with appropriate network provisioning. Again, OSS/BSS catalogs and inventories are provisioned and deployed assets administered and monitored by the OSS. Furthermore, metadata may also accompany the services as they move to other systems, etc. or as their data are captured in different service registries (e.g., UDDI). The metadata can be stored in the same registry, can be attached as a part of the service interface, or can be linked separately and stored in other repositories.

Figure 6A:
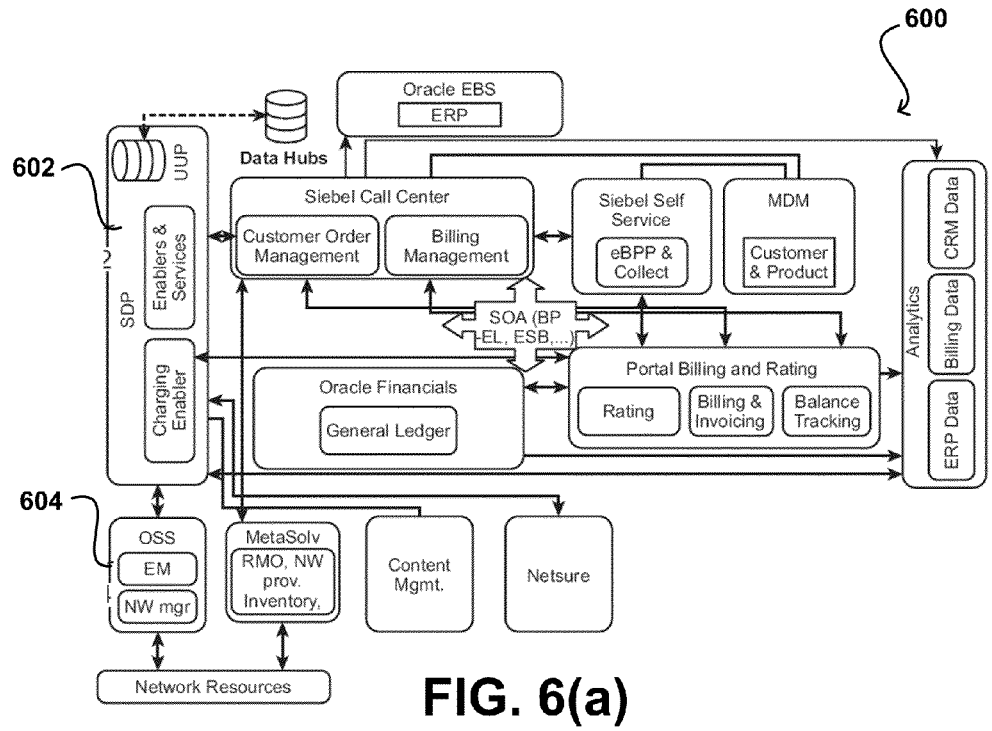
FIGS. 6(a) and 6(b) illustrate packaged and integrated OSS/BSS/SDP solutions and operations that can be used in accordance with various embodiments.
Figure 6B:
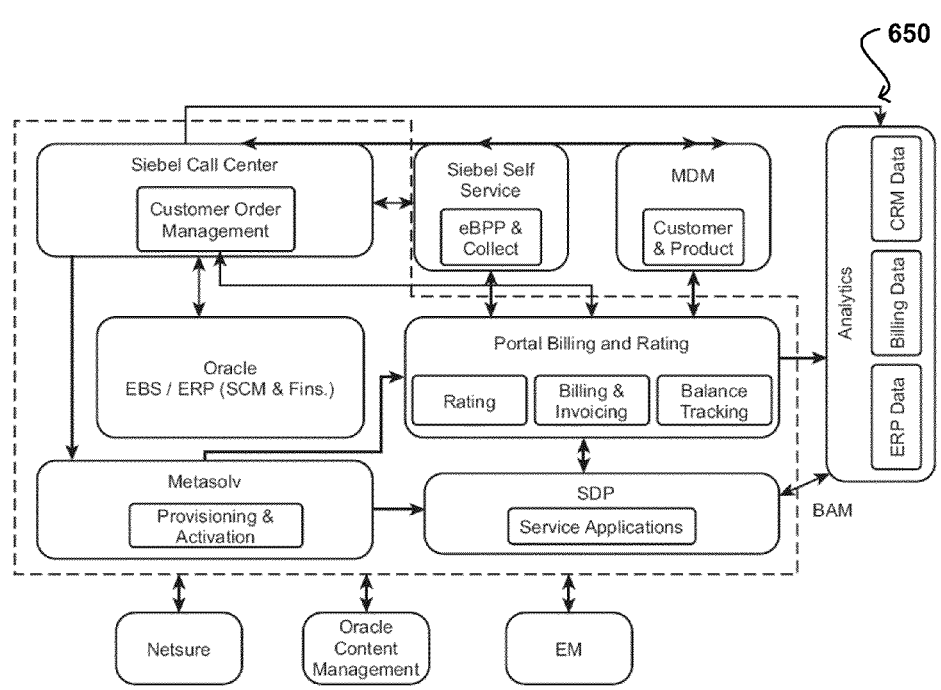

FIGS. 6(a) and 6(b) symbolically illustrate exemplary OSS/BSS/SDP integrations 600 and 650 that can be used in accordance with various embodiments. It should be understood that these are merely examples and it does not matter which OSS/BSS applications are used. Further, interfaces, messages, models, and other aspects may change from one application to another, for example, as would be understood to one of ordinary skill in the art in light of the teachings and suggestions contained herein. With CRM, a subscriber or third party can create an account either in self-service (e.g., web, IVR) mode or assisted by a CSR (e.g., call center, joint IM web session, form mailed, or point of sale). Upon creation of the customer account in the CRM (e.g., a data hub), these accounts are appropriately provisioned in the billing system and in the runtime (as user identities for the SDP 602), as well as when needed in the network or in the service delivery platform (e.g. using SOA/BPEL and/or MetaSolv that provides activation and provisioning and performs at least some of the fulfillment (possibly delegating to ERP)). Subscribers can then subscribe to services and third parties can sign up for services or other contractual agreements. Promotions or campaigns, for example, can suggest additional offers to the customer or partners. Credit or balance checks, as well as other business steps, may be taken. In addition to updates of the customer or partner data hub, upon a subscription or agreement, the customer management orchestrates the necessary steps such as the billing system being provisioned with rating and billing terms and the SDP and services being provisioned (e.g., authorization table, subscription information, preferences, settings, policies that reflect SLAs, etc.). Network resources may also be provisioned when required, which may involve allocating assets, sending products, updating inventories, and other steps in the ERP system. The MDM (master data management) module shown can include two data hubs, including UCM (Universal Customer Master) and PIM (Product catalog) modules, for example. As can be seen in the figure, the system can also utilize content management as is discussed in more detail below.

The subscriber or third party is able to interact with the services on the SDP. Network and service level charging may take place that results in balance updates according to the contracts. Revenue sharing credits may also be provided to other third parties. Usage itself can be monitored via BAM (Business Activity Monitoring) in real time, and BI (business intelligence) can be done in a batch/deferred mode of the SDP. In real time, the BAM information and balance updates can be reflected in the general ledger of the service provider, as well as in its analytics and BSS modules. Throughout operation, the OSS 604 monitors and/or administers the overall system. This can be done at the level of the middleware that runs the SDP and OSS/BSS, as well as at the level of the network via integration with the network OSS. Alerts to the OSS. These alerts rely on inventory and subscription information to detect affected assets and customers, as well as to support them. Similarly, CRM support can raise alerts in the OSS. These are just a few examples of integration flows that illustrate the power of the approach.

Figure 7:
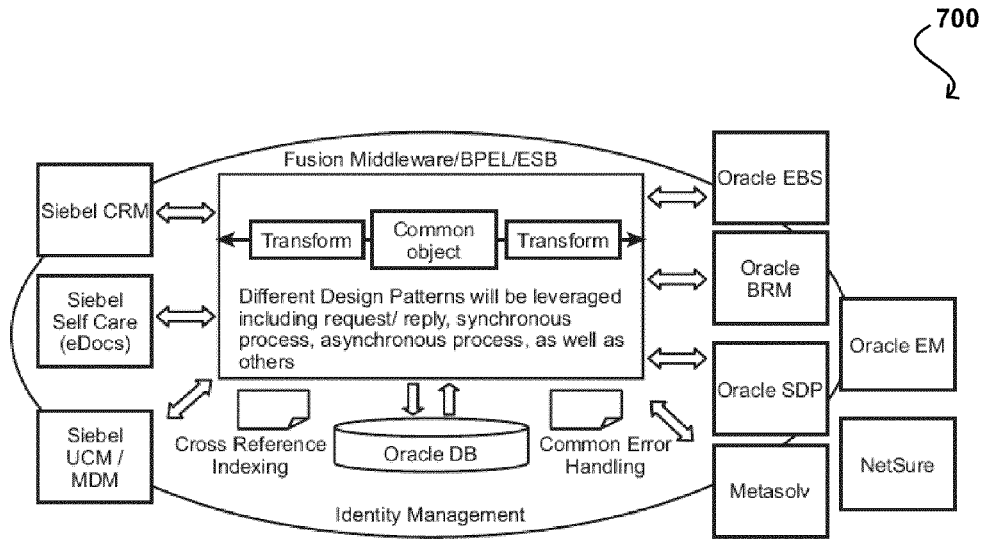
FIG. 7 illustrates an example of an architecture that can be used in accordance with one embodiment of the present invention.

FIG. 7 illustrates an integration model 700 that can be used in accordance with one embodiment of the present invention.

Here, the integration is based on a standard SOA using BPEL, EBS, and Web services (WS) with a canonical object model and appropriate transformations. Such an architecture provides for a number of OSS/BSS/SDP integration points. For example, a provisioning integration point allows for SDP and service provisioning via BSS. Items to be provisioned can include, for example, customer facing catalogs, inventories, application configuration, and provisioning data. Policies provisioning for policy enforcement is another example. Another integration point involves charging, including service or transaction charging as well as network or traffic charging.

Figure 8:
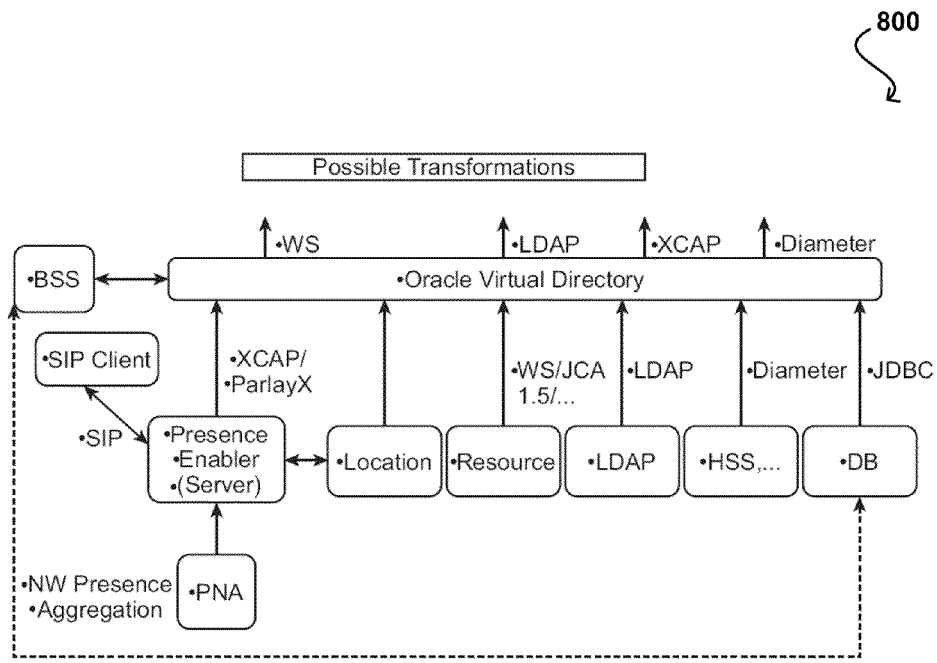
FIG. 8 illustrates an exemplary UUP-based architecture in accordance with one embodiment of the present invention.

Integration can also allow for linking with the UUP to perform functions such as exposing UCM management and MDM functionality. As illustrated in the exemplary architecture 800 of FIG. 8, a UUP of the virtual directory layer can aggregate the view of items and delegate subscriptions via calls to BSS/OSS. Such an approach can utilize customizable schema mapping and customizable distributed caching and pre-fetching. The northbound interfaces can also be wrapped and transformed as needed. Northbound interfaces can include Java, SOAP/HTTP, LDAP, Diameter, OMA GSSM, and XCAP interfaces, for example. Southbound protocols can include LDAP, XCAP, JDBC, Web service, and Diameter protocols, for example. Further discussion relating to FIG. 8 may be found in U.S. patent application Ser. No. 11/926,738, entitled SHARED VIEW OF CUSTOMERS ACROSS BSS AND SDP, filed on Oct. 29, 2007, and U.S. patent application Ser. No. 12/019,299, entitled SERVICE ORIENTED ARCHITECTURE (SOA) MANAGEMENT OF DATA REPOSITORY, filed on Jan. 24, 2008 which are incorporated by reference herein in their entirety for any and all purposes.

Figure 9A:
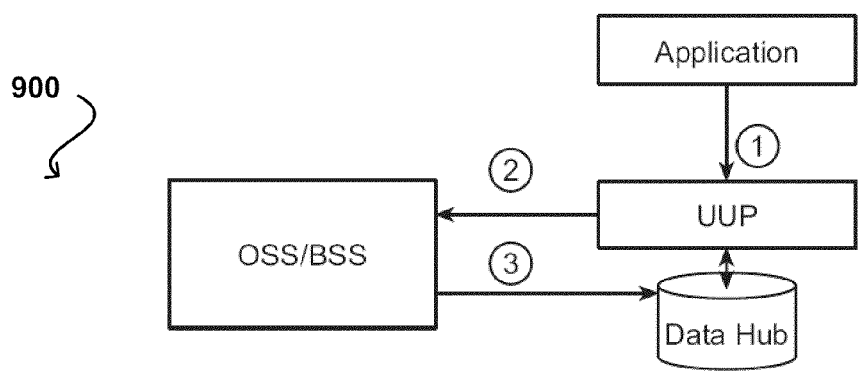
FIGS. 9(a) and 9(b) illustrate exemplary subscription management architectures in accordance with one embodiment of the present invention.
Figure 9B:
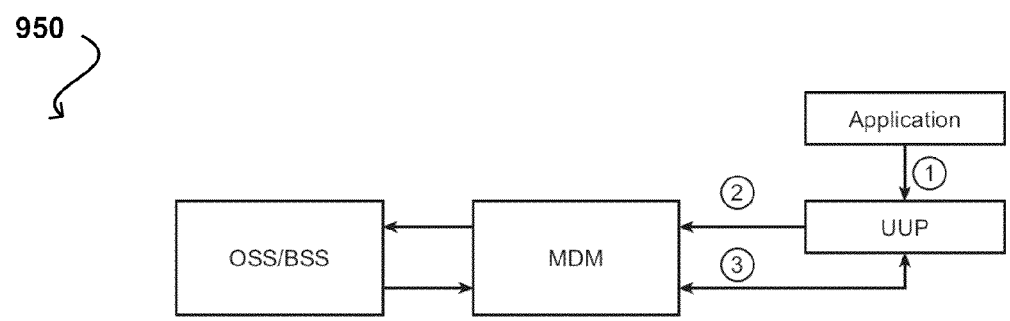

FIGS. 9(a) and 9(b) illustrate exemplary architectures 900, 950 for providing subscription/subscriber management in accordance with one embodiment. Further detail for such architectures is provided in the "Service Oriented Architecture (SOA) Management of Data Repository" application incorporated above. In one instance, the UUP directly implements the integration and data manipulations are delegated to OSS/BSS that, as a result, update the data seen/aggregated by the UUP. In another instance, the UUP performs the change on the database (e.g., MDM) that implements the integrations by launching SOA flows in OSS/BSS to match the data changes. Subscription management typically is a BSS operation, not a run-time or network operation. A subscription management component can integrate SuM, GSSM, and GUP with BSS to trigger operation and associated flows in/from BSS. In an integrated architecture, a request for subscription management may be passed to BSS, whereby BSS triggers MDM/UCM data updates and related flows. If no flow is triggered, updates can be done from UUP to a target repository. The behavior can be customizable and policy driven, for example. Runtime access can be provided via a UUP for service layer or network elements, provisioned by OSS/BSS, for lower layers such that there is not performance impact. Performances can be dictated by the repositories aggregated by the UUP, and caching and pre-fetch can be customizable.

Figure 10:
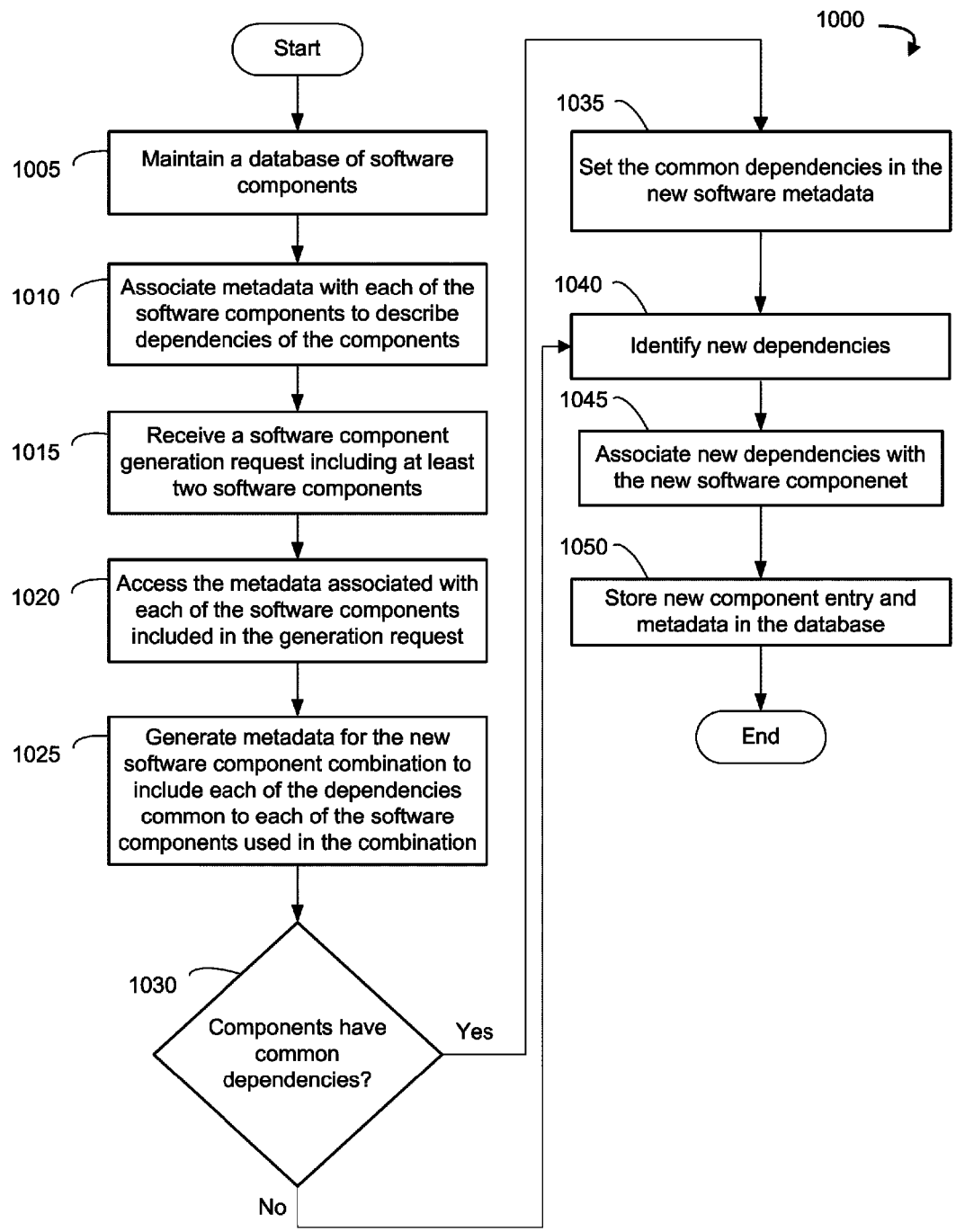
FIG. 10 is a flowchart illustrating a process for generating metadata for describing dependencies for composable elements/services, according to one embodiment of the present invention.

FIG. 10 illustrates a method 1000 for generating/coordinating metadata for describing dependencies for composable/programmable or repurposable elements/services, according to embodiments of the present invention. At process block 1005, a database of elements may be maintained. In one embodiment, the elements may include software components, software applications, services, etc. The database may be, for example, the Oracle® database in FIG. 7. The database may be accessed by the UUP and/or the OSS/BBS described above.

At process block 1010, each component entry in the database may include associated metadata. In one embodiment, the associated metadata may be configured to describe dependencies of each of the components. These dependencies may be, for example, tangible and/or intangible dependencies. Tangible dependencies, for example, may be dependencies which a programmer or software developer is aware of at compile time (or other software cycle time, such as when a dynamic library must be loaded). For example, if a software component needs to depend on a certain method or class call in order to work properly and the call is not included in the software component, then when the developer compiles, installs, or runs the software, the operation will fail. Thus, the developer will know that the tangible dependency has not been properly accounted for.

Alternatively, intangible dependencies are dependencies of which a developer and/or salesperson may not be aware at compile time or upon combining composable elements. In other words, when the salesperson places an order to combine two software components to create a new component, the developer may be able to combine the two components and even successfully compile the software; however, because of intangible dependencies, the newly combined software component may not work properly.

For example, the combination of the software components may be voice-over-IP (VOIP) and video chat. The VOIP may have the intangible dependencies of a low-bandwidth Internet connection, VOIP compatible phone system, and a persistent Internet connection. The video chat component may include the intangible dependencies of a high bandwidth Internet connection and a video device. Accordingly, if only one of either the VOIP or the video chat components' dependencies were relied upon, then the new VOIP/video chat component would not work properly (i.e., no VOIP-compatible phone, no persistent Internet connection, no video device, the wrong bandwidth speed, etc.). Hence, these intangible dependencies are stored in metadata associated with each component in order to allow a developer and/or salesperson to know the dependencies for each component.

At process block 1015, a software component (or service) generation request to combine at least two software components may be received. The request may be for the VOIP component to be combined with the video chat component, as described above, or a combination of other applications that are built on or assume VOIP or video chat. However, other combinations and additional components may be combined. After each of the components to be combined have been identified, the database storing the metadata for each of the components may be accessed (process block 1020).

At process block 1025, metadata for the new component may be generated. In one embodiment, the metadata may include each of the dependencies from the metadata of each of the combined components which are common to all of the components. At decision block 1030, a determination may be made whether any of the common dependencies exist for one or more of the components.

In one embodiment, the dependencies may be more restrictive (have higher values) for one or more of the components. Alternatively, algebra may be used to determine common dependencies. For example, in the above example, the VOIP component requires only a low-bandwidth Internet connection, whereas the video chat requires a high-bandwidth Internet connection. Hence, both components require an Internet connection (i.e., both components have the Internet connection dependency in common); however, the video chat component's Internet connection dependency is more restrictive than the VOIP's Internet connection dependency. Hence, the metadata for the newly created component combination would include the high-bandwidth Internet connection from the video chat component as opposed to the low-bandwidth Internet connection from the VOIP component (process block 1035).

At process block 1040, new dependencies for the new software component are identified. In one embodiment, the new dependency may be fully characterized by the new software component. For example, dependency C may be the result of the composition of dependency A and dependency B (i.e., DepC=(DepA, DepB)) (e.g., based on algebraic and/or composition rules). Furthermore, referring to the above example, the VOIP component has a dependency requiring a VOIP-compatible phone, whereas the video chat component has a dependency requiring a video device. Accordingly, in order for the newly combined component to function properly, the component would need both a VOIP-compatible phone and a video device. Thus, the new dependency would be included in the metadata created from the new (VOIP-video chat) component.

Additionally, when the new service is moved or information about the new service is stored, metadata about the new service needs be able to be located, as well as maintained consistent. Hence, the present invention provides for a process of maintaining such consistence and association of the metadata. In one embodiment, the metadata may be embedded in the description of the new service (or interface) in the UDDI and in the OSS/BSS repositories. Furthermore, embedded pointers to these repositories may be included in the metadata. Additionally, the metadata may be associated in other repositories and have the OSS/VBSS OSS/BSS/SDP integration, and tools process the metadata in parallel to service, service description, use of service, etc.

Furthermore, at process block 1045, the newly identified dependencies may be associated with the new software component. Then, at process block 1050, the new component entry as well as the newly created metadata may be stored in the database. The metadata would include each of the dependencies common to all combined components, the more restrictive dependencies for the common dependencies, and the unique dependencies. Thus, the newly combined component would include metadata which would properly identify all dependencies of the new component.

In some situations, it may be determined that, based on various component's dependencies, some components may not be able to be combined and still function properly. Alternatively, it may be determined that the combination of certain components alone may not work properly but, if an additional component (or components) were added to the combination, then the combination would function properly. Thus, when such a situation exists, suggestions may be made as to how to remedy the situation. Accordingly, this process illustrates that, in general, a framework where the combination rules can be changed, customized, programmed, etc. should be allowed. Hence, this is essentially a policy framework in which any combination of any condition and any actions can be used to generate the new dependencies. As shown in U.S. patent application Ser. No. 11/024,160, filed on Dec. 27, 2004, entitled POLICIES AS WORKFLOWS, and U.S. patent application Ser. No. 11/565,578, filed on Nov. 30, 2006, entitled ORCHESTRATION OF POLICY ENGINES AND FORMAT TECHNOLOGIES, which are incorporated by reference herein in their entirety for any and all purposes, this means that the way to describe such dependencies can also be modeled as the result of composition of the dependency descriptions into a new dependency description. So a particular model may have the dependencies described as an interface/XML document, and that the result of the composed and/or updated service is a composed dependency via SOA policies. For example, simply combining VOIP and video chat may not work unless an instant messaging component is also added. Therefore, the newly created component would be required to add additional dependencies from the instant messaging component into its metadata.

In a further embodiment, the combined components may be used in additional combinations. For example, a combined component may be the basis for another component combination, and another, and so forth allowing for the creation of additional components from previously combined components. Furthermore, the metadata is to follow the new component and it to be composed/updated as the components are composed/combined.

In one embodiment, the new components may be created: via software SCE (or via any combination/modification of hardware), via the OSS/BSS, or the OSS/BSS SCE. The first case means that when the software or hardware is updated, the metadata is just updated, and then when the OSS/BSS models receive the new component, the metadata is accessed to ensure that the new component is modeled properly. When the OSS/BSS has such different services and products modeled it may compose/combine products. When the OSS/BSS is able to imply use of its own flows to ensure that it produces the proper metadata. Typically, the OSS/BSS has logic to do so or otherwise it would use the same principles as the SW SCE approach. It is also possible that the OSS/BSS process of creating new products (e.g., OSS/BSS SCE) implies that changes are to be done programmatically (or manually) to the software and/or hardware. This is shown in the OSS/BSS integration flows found in U.S. patent application Ser. No. 12/019,335, filed on Jan. 24, 2008, entitled INTEGRATING OPERATIONAL AND BUSINESS SUPPORT SYSTEMS WITH A SERVICE DELIVERY PLATFORM, which is incorporated by reference herein in its entirety for any and all purposes.

The OSS/BSS may be configured to check the combination to determine if the dependencies have been satisfied. This is typically the case if the metadata was originally used to make sure that, in the OSS/BSS catalogs (e.g., SID data model), the product/services have their dependencies correctly identified in the OSS/BSS model. If, as mentioned above, the dependencies have not or cannot be satisfied by the current combination, the developer/salesperson may be notified as such. Then the developer/salesperson would be required to change the combination or add additional components to the combination (or modify software or hardware resources attached to the SDP or network level). In one embodiment, the OSS/BSS may provide the developer/salesperson with suggestions as to how to remedy the problem with the combination (or bundle). Accordingly, only legal (or fully functional) bundles may be created or sold, thus preventing confusion, frustration, or lost sales/profits.

In the foregoing description, for the purposes of illustration, methods were described in a particular order. It should be appreciated that, in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or set of logic circuits, to be programmed with the instructions to perform the methods to implement aspects of the present invention. These machine-executable instructions may be stored on one or more machine-readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of generating, maintaining, combining, and storing metadata which describe dependencies for composable elements, the method comprising:

maintaining a database describing information about a plurality of composable elements, wherein each of the plurality of composable elements has associated metadata to describe dependencies for each of the plurality of composable elements, wherein the metadata describes both tangible dependencies known to a developer of the composable element at compile time of that composable element and intangible dependencies that are unknown to the developer of the composable element at compile time of that composable element, and wherein each of the composable elements include one or more of: a combination, a reprogramming, or a repurposing of software components and/or services;

receiving a request to compose, modify, update, re-program, or re-purpose two or more of the plurality of composable elements into a new element;

determining common dependencies among the two or more composable elements;

determining redundant dependencies among the two or more composable elements;

combining the dependencies to include each of any redundant dependencies from the combined components as well as any dependencies unique to each of the combined components or services, and any dependency that is common to more than one, then the more restrictive component dependency is utilized within the new element, wherein each dependency includes an associated level of dependency value and the higher the level of dependency value the more restrictive the dependency, and wherein the determination of the utilization of the common dependency is determined based on each of the levels of dependency of the common dependencies;

determining new dependencies needed for the new element based on the combined dependencies, the new dependencies comprising at least one intangible dependency; and generating metadata for the new element to include each of the common dependencies and each of the new dependencies.

2. The method of claim 1, further comprising:
comparing dependencies of the two or more of the plurality of composable elements in order to determine dependencies common to the two or more of the plurality of composable elements and to determine dependencies unique to the two or more of the plurality of composable elements.

3. The method of claim 1, further comprising:
determining if the new element is functional, wherein the new element is functional if the dependencies of the new element are able to be satisfied; and
in response to the new element being functional, storing the new element in the database.

4. The method of claim 1, wherein the intangible dependencies comprise a hardware requirement and one or more of the following: an operating system requirement, a bandwidth requirement, or a network type requirement, and wherein the hardware requirement includes one or more of the following: a video camera, a network card, a DVD drive, or video projector.

5. The method of claim 1, wherein the comparing of the dependencies comprises accessing an Operations Support System/Business Support System (OSS/BSS) system to look up the dependencies.

6. The method of claim 5, based on the metadata for the new element, determining, at the OSS/BSS, whether the dependencies of the new element are satisfied, wherein, in response to the dependencies of the new element being unsatisfied, generating a response to the request indicating that the new element is unable to be generated, and wherein the response includes a list of the dependencies which are unsatisfied and suggestions for steps to take in order to remedy the problem with the dependencies.

7. The method of claim 1, further comprising:
presenting a list of the plurality of composable elements to select from for generating the new element; and
displaying the metadata associated with the plurality of composable elements.

8. A system for generating, maintaining, combining, and storing metadata which describe dependencies for composable elements, the system comprising:
a memory device; and
a computer processor in communication with the memory device, wherein the memory device has sets of instructions stored therein which, when executed by the computer processor, cause the computer processor to:
store at a database a plurality of composable elements, wherein each of the plurality of composable elements has associated metadata to describe dependencies for each of the plurality of composable elements, wherein the metadata describes both tangible dependencies known to a developer of the composable element at compile time of that composable element and intangible dependencies that are unknown to the developer of the composable element at compile time of that composable element, and wherein the composable elements includes one or more of: a combination, a reprogramming, or a repurposing of software components and/or services; and
receive at an Operations Support System/Business Support System (OSS/BSS) coupled with the database a request to compose two or more of the plurality of composable elements into a new element, compare dependencies of the two or more of the plurality of composable elements in order to determine dependencies common to the two or more of the plurality of composable elements and unique to the two or more of the plurality of composable elements, determine redundant dependencies among the two or more composable elements, combine the dependencies to include each of any redundant dependencies from the combined components as well as any dependencies unique to each of the combined components or services, and any dependency that is common to more than one, then the more restrictive component dependency is utilized within the new element, determining new dependencies needed for the new element based on the combined dependencies, the new dependencies comprising at least one intangible dependency, and generate metadata for the new element to include each of the unique dependencies and each of the common dependencies, wherein each dependency includes an associated level of dependency value and the higher the level of dependency value the more restrictive the dependency, and wherein the determination of the utilization of the common dependency is determined based on each of the levels of dependency of the common dependencies.

9. The system of claim 8, further comprising a Supply Chain Execution (SCE) configured to manage the dependencies when the new element is created by composing the plurality of composable elements.

10. The system of claim 8, wherein the database is further configured to store the new element and the metadata for the new element.

11. The system of claim 8, wherein the plurality of composable elements comprise both hardware and software elements.

12. The system of claim 11, wherein the new element is composed of a combination of at least one hardware element and at least one software element.

13. The system of claim 8, wherein the OSS/BSS makes changes to the new elements in wither hardware or software.

14. A non-transitory machine-readable medium for generating, maintaining, combining, and storing metadata which describe dependencies for composable elements which, when executed by a machine, causes the machine to:
maintain a database describing information about a plurality of composable elements, wherein each of the plurality of composable elements has associated metadata to describe dependencies for each of the plurality of composable elements, wherein the metadata describes both tangible dependencies known to a developer of the composable element at compile time of that composable element and intangible dependencies that are unknown to the developer of the composable element at compile time of that composable element, and wherein the composable elements include one or more of: a combination, a reprogramming, or a repurposing of software components and/or services;
receive a request to compose, modify, update, reprogram, or repurpose two or more of the plurality of composable elements into a new element;
determine common dependencies among the two or more composable elements;
determine redundant dependencies among the two or more composable elements;
combine the dependencies to include each of any redundant dependencies from the combined components as well as any dependencies unique to each of the combined components or services, and any dependency that is common to more than one, then the more restrictive component dependency is utilized within the new element, wherein each dependency includes an associated level of dependency value and the higher the level of dependency value the more restrictive the dependency, and wherein the determination of the utilization of the common dependency is determined based on each of the levels of dependency of the common dependencies;
determine new dependencies needed for the new element based on the combined dependencies, the new dependencies comprising at least one intangible dependency; and generate metadata for the new element to include each of the common dependencies and each of the new dependencies.

15. The non-transitory machine-readable medium of claim 14, wherein the set of instructions which, when further executed by the machine, cause the machine to present a list of the plurality of composable elements to select from for generating the new element.

16. The non-transitory machine-readable medium of claim 15, wherein the set of instructions which, when further executed by the machine, cause the machine to display the metadata associated with the plurality of composable elements.

17. The non-transitory machine-readable medium of claim 15, wherein the modification, updating, reprogramming, or re-purposing of two or more of the plurality of composable elements into the new element further comprises utilizing relational algebra.

18. The non-transitory machine-readable medium of claim 17, wherein the set of instructions which, when further executed by the machine, cause the machine to update the metadata for the new element based on the relational algebra used to compose the new element or create a new element.

19. The non-transitory machine-readable medium of claim 18, wherein the metadata is associated with the new element and a description of the new element is updated based on the metadata, and when the new element is relocated, the associated metadata is relocated with the new element, and the new element is stored in a registry and the metadata is also stored in the registry along with the new element, the metadata is attached to the new element as part of a service interface, and the metadata is stored in a repository separate from the new element and is separately linked to the new element.

20. The non-transitory machine-readable medium of claim 14, wherein the set of instructions which, when further executed by the machine, cause the machine to:
   determine if the new element composition will function properly; and
   based on the determination that the new element composition will function improperly, suggest one or more additional elements within the plurality of composable elements to further compose with the new element, wherein the determination of whether the new element composition will function properly is made by accessing an Extensible Markup Language (XML) document which is configured to enforce a composition policy.

* * * * *